United States Patent
Kang et al.

(10) Patent No.: US 8,110,249 B2
(45) Date of Patent: Feb. 7, 2012

(54) UV-CURABLE ANTIREFLECTIVE COATING COMPOSITION, ANTIREFLECTIVE COATING FILM USING THE SAME, AND ITS MANUFACTURING METHOD

(75) Inventors: Joon-Koo Kang, Daejeon (KR); Mi-Young Han, Daejeon (KR); Young-Eun Lee, Daejeon (KR); Young-Jun Hong, Daejeon (KR); Yeong-Rae Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 281 days.

(21) Appl. No.: 12/309,181

(22) PCT Filed: Jul. 6, 2007

(86) PCT No.: PCT/KR2007/003286
§ 371 (c)(1), (2), (4) Date: Oct. 27, 2009

(87) PCT Pub. No.: WO2008/007874
PCT Pub. Date: Jan. 17, 2008

(65) Prior Publication Data
US 2010/0076109 A1    Mar. 25, 2010

(30) Foreign Application Priority Data
Jul. 10, 2006  (KR) ......................... 10-2006-0064408

(51) Int. Cl.
*C09D 133/08* (2006.01)
*C09D 133/16* (2006.01)
*C09D 127/12* (2006.01)
*C08L 27/12* (2006.01)
*G02B 1/10* (2006.01)
*G02B 1/11* (2006.01)

(52) U.S. Cl. .............. 427/162; 522/71; 522/79; 522/81; 522/84; 522/173; 522/182; 524/544; 524/545; 524/546; 524/560

(58) Field of Classification Search ............ 522/71, 522/79, 81, 84, 173, 182; 427/162; 524/544, 524/545, 546, 560
See application file for complete search history.

(56) References Cited

U.S. PATENT DOCUMENTS

| | | | |
|---|---|---|---|
| 6,087,010 A | 7/2000 | Yoshida et al. | |
| 6,166,855 A * | 12/2000 | Ikeyama et al. | 359/580 |
| 6,383,559 B1 * | 5/2002 | Nakamura et al. | 427/180 |
| 6,713,170 B1 | 3/2004 | Kaneko et al. | |
| 7,502,088 B2 * | 3/2009 | Suzuki et al. | 349/141 |
| 2003/0120008 A1 | 6/2003 | Obayashi et al. | |
| 2005/0038137 A1 | 2/2005 | Yoshihara et al. | |
| 2006/0051549 A1 | 3/2006 | Mano | |
| 2008/0113165 A1 * | 5/2008 | Watanabe | 428/212 |
| 2009/0285993 A1 * | 11/2009 | Kang et al. | 427/380 |

FOREIGN PATENT DOCUMENTS

| | | |
|---|---|---|
| EP | 0 863 128 | 9/1998 |
| EP | 1447 433 A1 | 8/2004 |
| JP | 62-250047 A | 10/1987 |
| JP | 05-105424 | 4/1993 |
| JP | 7-126552 A | 5/1995 |
| JP | 08-122501 | 5/1996 |
| JP | 09-11186 | 4/1997 |
| JP | 09-208898 | 8/1997 |
| JP | 11-002702 | 1/1999 |
| JP | 2000-017099 | 1/2000 |
| JP | 2002-3550 A | 1/2002 |
| JP | 2003-183592 | 7/2003 |
| JP | 2004-45462 A | 2/2004 |
| JP | 2006-28409 A | 2/2006 |
| KR | 1020050118911 | 12/2005 |
| WO | WO 2005/097483 A1 | 10/2005 |

* cited by examiner

*Primary Examiner* — Susan W Berman
(74) *Attorney, Agent, or Firm* — McKenna Long & Aldridge LLP

(57) ABSTRACT

An antireflective coating composition includes a photopolymerizable acrylate monomer (C1); a particle-type metal fluoride (C2) with a refractive index of 1.40 or less; a photopolymerization initiator (C3); and at least one liquid dispersion-enhancing chelating agent (C4) selected from the group consisting of $Mg(CF_3COO)_2$, $Na(CF_3COO)$, $K(CF_3COO)$, $Ca(CF_3COO)_2$, $Mg(CF_2COCHCOCF_3)_2$ and $Na(CF_2COCHCOCF_3)$. This composition ensures good mechanical strength, excellent adhesion to a substrate, short curing time by UV curing, prevention of dust attachment, good erasure of stain, good dust removal and good scratch resistance, so it is usefully for making an antireflective coating film of a display.

8 Claims, No Drawings

UV-CURABLE ANTIREFLECTIVE COATING COMPOSITION, ANTIREFLECTIVE COATING FILM USING THE SAME, AND ITS MANUFACTURING METHOD

This application claims priority to PCT/KR2007/003286 filed on Jul. 6, 2007 and also Korean Patent Application No. 10-2006-0064408 filed on Jul. 10, 2006, the contents of which are hereby incorporated by reference in their entirety.

BACKGROUND OF THE INVENTION

1. Field of the Invention

The present invention relates to a UV (Ultraviolet) curable antireflective coating composition, an antireflective coating film using the same, and its manufacturing method. More particularly, the present invention relates to a UV-curable antireflective coating composition that is cured at a normal temperature in a UV curing manner, an antireflective coating film using the same, and its manufacturing method.

2. Description of the Related Art

Modern persons come in contact with various displays such as Braun tubes like CRT (Cathode-Ray Tube) for monitors and CPT (Color Picture Tube) for TV, TFT-LCD (Thin Film Transistor—Liquid Crystal Display) polarizers, PDP (Plasma Display Panel) filters, RPTS (Rear Projection TV Screen) filters, LCD for cellular phones, watches, photos, and picture frames. When exposed to light, such displays give a reflective light, causing fatigue on the eyes or headache, and also an image is not clearly formed in such displays, resulting in deteriorated contrast.

To solve such problems, a study for forming an antireflective coating film is in progress. In this study, a film having a lower refractive index than a substrate is formed on the substrate to lower reflexibility. This low refractive index film may have a single layer by vacuum deposition of magnesium fluoride ($MgF_2$) with a low refractive index or have multiple layers by laminating films with different refractive indexes. However, the vacuum technique such as vacuum deposition, used for forming a multi-layer film, requires a high cost, so it is not practical.

In this regards, Japanese Laid-open Patent Publication H5-105424 discloses a method for forming a low refractive index film by coating a coating liquid containing $MgF_2$ particles on a substrate by means of wet coating such as spinning or dipping. However, a film obtained by this method has drawbacks of seriously low mechanical strength and very bad adhesive force with the substrate, so it can be hardly used. In addition, this film has a curing temperature over 100° C., so it cannot be used for a plastic substrate made of PET (polyethylene terephthalate), PC (polycarbonate) or TAC (tri-acetyl-cellulose).

Meanwhile, to solve the drawbacks of the above method using a coating liquid containing $MgF_2$ particles, there are proposed other methods in Japanese Laid-open Patent Publication 1997-208898, Japanese Laid-open Patent Publication 1996-122501 and so on. These documents disclose a method for making a coating liquid with a low reflection function and a stain resistance function according to a lowered surface energy by using a compound having fluoric silane and fluoric alkyl group. However, the low reflection layer containing fluoric silane is easily electrically charged due to friction or the like by the fluoric group positioned on the film surface, so dust is easily adhered thereto, and the dust is not easily detached once it is adhered thereto. Also, this method adopts heat curing, which needs a high curing temperature or a long curing time disadvantageously.

These problems may be solved if good mechanical strength, good adhesion to the substrate and low curing temperature are satisfied using UV-curable materials and a coating liquid containing metal fluoride particles with a refractive index of 1.40 or less. However, a metal fluoride particle with a refractive index of 1.40 or less is generally coated by means of wet coating, not using a single deposition manner, so its mechanical strength and adhesion to the substrate are deteriorated when forming a low refractive index film. Also, such a metal fluoride particle needs a high curing temperature. In addition, when being used together with UV-curable materials such as acrylate as well as other heat-curing materials such as silane, the metal fluoride particle shows a problem in compatibility, namely easily settling down or becoming misty when forming a film, so it can be hardly used.

As mentioned above, there have been many endeavors for making an antireflective coating film having excellent mechanical strength, improved adhesion to a substrate, a shortened heat curing time and a prevention of dust attachment by progressing a UV curing process using metal fluoride particles with a refractive index of 1.40 or less, photopolymerizable monomer and photopolymerization initiator, and the present invention is designed under such circumstances.

SUMMARY OF THE INVENTION

The present invention is designed to solve the above problems. An object of the present invention is to provide an antireflective coating composition, which includes a metal fluoride with a refractive index of 1.40 or less, a photopolymerizable acrylate monomer and a photopolymerization initiator, and also further includes a dispersion-enhancing chelating agent for improving compatibility of the composition, thereby capable of improving a mechanical strength, enhancing adhesion to a substrate, ensuring a short curing time by UV curing, and preventing attachment of dust; an antireflective coating film using the composition; and a method for manufacturing the film.

In order to accomplish the above object, the present invention provides an antireflective coating composition, which includes a photopolymerizable acrylate monomer (C1); a particle-type metal fluoride (C2) with a refractive index of 1.40 or less; a photopolymerization initiator (C3); and at least one liquid dispersion-enhancing chelating agent (C4) selected from the group consisting of $Mg(CF_3COO)_2$, $Na(CF_3COO)$, $K(CF_3COO)$, $Ca(CF_3COO)_2$, $Mg(CF_2COCHCOCF_3)_2$ and $Na(CF_2COCHCOCF_3)$.

In the antireflective coating composition of the present invention, the photopolymerizable acrylate monomer (C1) is used for enhancing strength of the coating film and adhesion with a display substrate.

The photopolymerizable acrylate monomer (C1) may reactive acrylate oligomer, multi-functional acrylate monomer or fluoric acrylate, and it may be at least one material selected from the group consisting of urethane acrylate oligomer, epoxy acrylate oligomer, dipentaerythritol hexa-acrylate, dipentaerythritol hydroxyl penta-acrylate, pentaerhthritol tetra-acrylate, pentaerythritol tri-acrylate, tri-methylene propyl tri-acrylate, propoxylated glycerol tri-acrylate, trimethyl propane ethoxy tri-acrylate, and compounds expressed in the following chemical formulas 1 to 5:

Chemical Formula 1

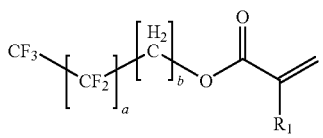

where $R_1$ is —H or —$CH_3$, a is an integer from 0 to 4, and b is an integer from 1 to 3, Chemical Formula 2

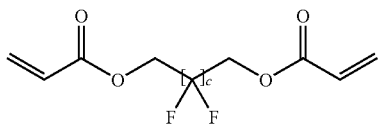

where c is an integer from 1 to 10,

Chemical Formula 3

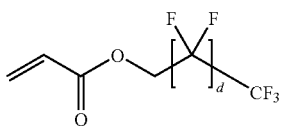

where d is an integer from 1 to 9,

Chemical Formula 4

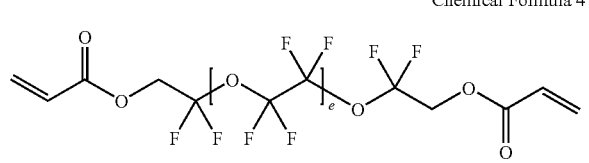

where e is an integer from 1 to 5,

Chemical Formula 5

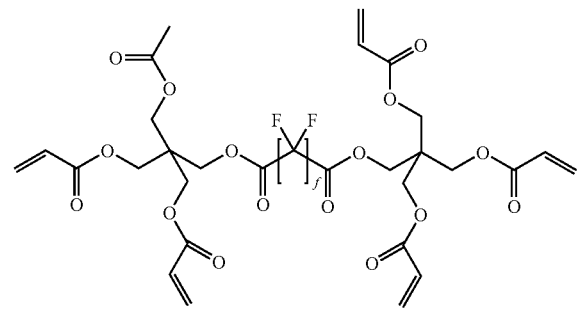

where f is an integer from 4 to 10.

Preferably, in the antireflective coating composition of the present invention, the metal fluoride (C2) is in a particulate powder state with an average diameter of 10 to 100 nm, and it is preferably at least one material selected from the group consisting of NaF, LiF, $AlF_3$, $Na_5Al_3F_{14}$, $Na_3AlF_6$, $MgF_2$ and $YF_3$.

The metal fluoride (C2) is preferably used in the range of keeping a low reflection property of the coating film, strength of the coating film, and adhesion with a display substrate, and more preferably 10 to 80 parts by weight of the metal fluoride (C2) is used based on 100 parts by weight of the photopolymerizable acrylate monomer (C1).

In the antireflective coating composition of the present invention, the photopolymerization initiator (C3) may adopt any photopolymerization initiator commonly used in the art. But, it is apparent that more optimal materials may be selected in correspondence to a wavelength range of a UV lamp used in the UV curing. The photopolymerization initiator (C3) may be at least one selected from the group consisting of chloroacetophenone, diethoxy acetophenone, hydroxyl acetophenone, α-amino acetophenone, benzoin ether, benzyl dimethyl ketal, benzophenone, thioxanthone, and 2-2-ethylanthraquinone (2-ETAQ). In addition, for improving a curing property of the coating composition, amines such as diethylene triamine, diethanol amine and ethylene diamine may also be used in mixture together with the photopolymerization initiator (C3).

The content of photopolymerization initiator (C3) is controlled in the range of keeping a curing speed, a refractive index and a strength of the coating film, and preferably 0.5 to 30 parts by weight of photopolymerization initiator (C3) is used based on 100 parts by weight of the photopolymerizable acrylate monomer (C1).

In the antireflective coating composition according to the present invention, the dispersion-enhancing chelating agent (C4) is a liquid component used for endowing compatibility between the photopolymerizable acrylate monomer (C1) and the metal fluoride (C2) such that the metal fluoride does not easily lump, and also preventing the coating film from being misty. The dispersion-enhancing chelating agent (C4) preferably adopts at least one selected from the group consisting of $Mg(CF_3COO)_2$, $Na(CF_3COO)$, $K(CF_3COO)$, $Ca(CF_3COO)_2$, $Mg(CF_2COCHCOCF_3)_2$ and $Na(CF_2COCHCOCF_3)$.

The dispersion-enhancing chelating agent (C4) is preferably used in the range of keeping dispersion of metal fluoride particles, strength of the coating film, and adhesion to a display substrate. Specifically, 1 to 20 parts by weight of dispersion-enhancing chelating agent (C4) is used based on 100 parts by weight of the photopolymerizable acrylate monomer (C1).

The antireflective coating composition of the present invention may further include additives (C5) and organic solvent (C6) as required.

Additives (C5) possibly included in the antireflective coating composition of the present invention may be a wetting agent and a leveling agent, but not limitedly. As representative examples, at least one selected from the group consisting of polyester polysiloxane wetting agents, fluoric wetting agents, polysiloxane leveling agents, and acrylic leveling agents may be used.

The additive (C5) is preferably used in the range of keeping the strength of the coating film. Specifically, 0.1 to 30 parts by weight of additives (C5) is preferably used based on 100 parts by weight of the photopolymerizable acrylate monomer (C1).

Organic solvent (C6) possibly included in the antireflective coating composition of the present invention may be suitably mixed in consideration of a coating property of the coating composition or compatibility with components.

The organic solvent (C6) may be selectively used in consideration of a drying temperature and a curing temperature, and preferably a single solvent or a mixed solvent selected from the group consisting of aromatic hydrocarbons, aliphatic hydrocarbons, alcohols, ketones, amides, and ethers. Meanwhile, the organic solvent (C6) is more preferably at least one selected from the group consisting of hexane, heptane, toluene, benzene, methanol, ethanol, propanol, butanol, ethyl cellosolve, butyl cellosolve, hexyl cellosolve, methyl cellosolve, isopropoxy cellosolve, acetone, methylethylketone, diacetonalcohol, n-methyl pyrrolidinon, methyl isobutylketone, dimethylformamide, and tetrahydrofuran.

The organic solvent (C6) may be used as a diluting solvent that makes the antireflective coating composition have a solid content of 0.1 to 30 weight %.

The antireflective coating composition of the present invention may be used in a diluted state such that its solid content becomes 0.1 to 30 weight%, more preferably 0.5 to 20 weight %.

In another aspect of the present invention, there is also provided an antireflective coating film, which is manufactured using the antireflective coating composition described as above.

That is to say, the antireflective coating composition of the present invention may be used as a material of an antireflective coating layer, and also a hard coating layer or a high refractive index layer may be further included thereto to make a multi-layer structure.

A display substrate commonly used in the art is a glass substrate, a plastic substrate, a plastic film or the like, and a coating method of the composition may be freely selected according the kind of substrate. In addition, the hard coating layer may adopt a UV-curable resin, or inorganic nano particles may be dispersed in the UV-curable resin so as to improve abrasion resistance.

A thickness of the antireflective coating film of the present invention is determined according to refractive indexes of the used display substrate and other material layers and a wavelength of incident light, so it is not specially limited. But, the thickness of the antireflective coating film is preferably 50 to 200 nm.

For example, in case a hard coating layer and an antireflective coating layer are coated on the display substrate, assuming that the hard coating layer has a refractive index of 1.51, the antireflective coating layer has a refractive index of 1.38 and a designed wavelength of the incident light is 550 nm, it is preferable that the antireflective coating layer is coated in a thickness of 100 nm according to the optical design. In addition, the refractive index of the antireflective coating layer is generally preferable as it is lower. In particular, as a difference of refractive indexes between the antireflective coating layer and a lower layer is great, the antireflective effect is increased.

In still another aspect of the present invention, there is also provided a method for manufacturing an antireflective coating film, which includes (S1) coating the antireflective coating composition described as above on a display substrate to have a dried thickness of 50 to 200 nm; (S2) drying the coated display substrate, prepared in the step (S1), at 20 to 150° C. for 0.5 to 10 minutes; and (S3) curing the dried coated display substrate, prepared in the step (S2), for 1 to 30 seconds with a UV (Ultraviolet) irradiation dose of 0.2 to 2 J/cm$^2$.

The method for manufacturing an antireflective coating film according to the present invention will be explained later in more detail.

DESCRIPTION OF THE PREFERRED EMBODIMENT

Hereinafter, preferred embodiments of the present invention will be described in detail based on embodiments. However, the embodiments of the present invention may be modified in various ways, and the scope of the present invention should be not interpreted as being limited to the embodiments. The embodiments of the present invention are provided just for explaining the present invention more perfectly to those having ordinary skill in the art.

As seen from the following Table 1, compositions having components and contents classified into embodiments 1 and 2 and comparative examples 1 to 3 were prepared, and coating films were manufactured using the compositions.

Embodiment 1

An antireflective coating composition was prepared by mixing 100 parts by weight of pentaerythritol tetra-acrylate, 250 parts by weight of 10% $MgF_2$ dispersing agent (Nissan MFS-10P), 5 parts by weight of magnesium tri-fluoro acetate, 10 parts by weight of Irgacure-127 acting as a photopolarization initiator, 1 parts by weight of wetting agent (Tego-453), and 1000 parts by weight of methylethylketone and 400 parts by weight of butyle cellosolve acting as organic solvents.

The antireflective coating composition prepared as above was coated on a hard coating film by means of roll coating to have a dried thickness of 100 nm. The coated film was dried for 2 minutes in an oven at 60° C., and then UV-cured under a nitrogen environment with a UV irradiation dose of 0.5 J/cm$^2$ using a medium pressure mercury lamp.

Embodiment 2

An antireflective coating composition was prepared in the same way as the embodiment 1, except that 500 parts by weight of 10% $MgF_2$ dispersing agent (Nissan MFS-10P) and 10 parts by weight of magnesium tri-fluoro acetate were mixed, and then a coating film was manufactured using the composition.

COMPARATIVE EXAMPLE 1

An antireflective coating composition was prepared in the same way as the embodiment 1, except that 10% $MgF_2$ dispersing agent (Nissan MFS-10P) is not added, and then a coating film was manufactured using the composition.

COMPARATIVE EXAMPLE 2

An antireflective coating composition was prepared in the same way as the embodiment 1, except that magnesium tri-fluoro acetate acting as a dispersion-enhancing chelating agent is not added, and then a coating film was manufactured using the composition.

COMPARATIVE EXAMPLE 3

An antireflective coating composition was prepared in the same way as the embodiment 1, except that 10% $MgF_2$ dispersing agent (Nissan MFS-10P) and magnesium tri-fluoro acetate are not added, and then a coating film was manufactured using the composition.

TABLE 1

|  | Contents (parts by weight) | | | | |
| --- | --- | --- | --- | --- | --- |
|  | Embodiments | | Comparative Examples | | |
|  | 1 | 2 | 1 | 2 | 3 |
| pentaerythritol tetra-acrylate | 100 | 100 | 100 | 100 | 100 |
| 10% MgF$_2$ dispersing agent (Nissan MFS-10P) | 250 | 500 | — | 250 | — |
| magnesium tri-fluoro acetate | 5 | 10 | 5 | — | — |
| Irgacure-184 | 10 | 10 | 10 | 10 | 10 |
| wetting agent (Tego-453) | 1 | 1 | 1 | 1 | 1 |
| methylethylketone | 1000 | 1000 | 1000 | 1000 | 1000 |
| butyle cellosolve | 400 | 400 | 400 | 400 | 400 |

EXPERIMENTAL EXAMPLES

For the coating films manufactured by the embodiments 1 and 2 and the comparative examples 1 to 3, adhesion to a substrate, pen erasure, stain removal, scratch resistance, reflectivity and brilliance were respectively measured to evaluate easiness of stain removal and optical features of each coating film relatively.

EXPERIMENTAL EXAMPLE 1

Adhesion to a Substrate

After a cut portion in a check pattern with 10 horizontal and vertical lines at 1 mm intervals was formed in the coating film, obtained by coating and curing according to JIS K5400, a cellophane adhesive tape (Cellotape, Nichiban Co., Ltd.) was strongly attached thereto, and then one end of the tape was gripped and strongly pulled in a direction perpendicular to its surface. After that, exfoliation of the hard coating layer was observed by the naked eyes, which was evaluated as "good" when the hard coating layer was not exfoliated and "bad" when exfoliated.

EXPERIMENTAL EXAMPLE 2

Pen Erasure

Pen erasure was observed by the naked eyes while writing letters on the coating film using an oil-based pen and then rubbing it with a cotton stuff, which was evaluated as "good" when the letters were well erased and "bad" when not well erased.

EXPERIMENTAL EXAMPLE 3

Dust Removal

After rubbing the coating film with a size of 10×10 cm in length and width 20 times reciprocally using a cotton stuff, powder was sprayed thereto at a distance of 30 cm 5 times at 1 minute intervals. Air of 2 atm was blown to the coating surface on which the powder was piled up, for 10 seconds, and then remaining powder was observed by the naked eyes, which was classified into "good" when the remaining powder is small and "bad" when the remaining powder is great.

EXPERIMENTAL EXAMPLE 4

Scratch Resistance

The coating film was scrubbed using an abrader having a steel wool (#0000) with a load of 250 g, and then observed to check whether any scratch was made. The result is classified into "good" if the scratch resistance is strong, "normal" if the scratch resistance is normal, and "bad" if the scratch resistance is weak.

EXPERIMENTAL EXAMPLE 5

Reflectivity

A rear side of the coating film was processed into black, and then its reflectivity was measured using a spectrophotometer, produced by N&K, to find a minimum reflectivity as indicated in the following Table 2, so as to evaluate reflection properties.

EXPERIMENTAL EXAMPLE 6

Brilliance (Haze)

A hazemeter was used to measure a haze of the coating film, and its result is indicated in the following Table 2.

TABLE 2

|  |  | Adhesion to substrate | Penerasure | Scratch resistance | Dust removal | Minimum reflectivity (%) | Haze (%) |
| --- | --- | --- | --- | --- | --- | --- | --- |
| Embodiment | 1 | good | good | good | good | 2.2 | 0.3 |
|  | 2 | good | good | good | good | 1.7 | 0.3 |
| Comparative Example | 1 | bad | good | bad | good | 3.5 | 0.3 |
|  | 2 | normal | good | normal | good | — | 4.0 |
|  | 3 | good | good | good | good | 4.0 | 0.3 |

As seen from the Table 2, it would be understood that the coating films proposed in the embodiment 1 and 2 are manufactured using the composition containing metal fluoride and dispersion-enhancing chelating agent together, and they are excellent in adhesion to a substrate, scratch resistance and reflectivity when compared with the comparative examples 1 to 3. Also, it would be understood that the coating films proposed in the comparative examples 2 and 3, not containing the dispersion-enhancing chelating agent, become misty, undesirably.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

As described above, the UV-curable antireflective coating composition according to the present invention contains a dispersion-enhancing chelating agent for improving compatibility between photopolymerizable acrylate monomer and metal fluoride with a refractive index of 1.40 or less, so it has an excellent mechanical strength, good adhesion to a substrate, a very short curing time owing to UV curing, a dust attachment preventing effect, erasure of stain, dust removal and excellent scratch resistance. Thus, the UV-curable antireflective coating composition of the present invention may be usefully used for manufacturing an antireflective coating film.

What is claimed is:

1. An antireflective coating composition, comprising:
   a photopolymerizable acrylate monomer (C1);
   a particulate metal fluoride (C2) with a refractive index of 1.40 or less;
   a photopolymerization initiator (C3); and
   at least one liquid dispersion-enhancing chelating agent (C4) selected from the group consisting of $Mg(CF_3COO)_2$, $Na(CF_3COO)$, $K(CF_3COO)$, $Ca(CF_3COO)_2$, $Mg(CF_2COCHCOCF_3)_2$ and $Na(CF_2COCHCOCF_3)$.

2. The antireflective coating composition according to claim 1, wherein the composition comprises, based on 100 parts by weight of the photopolymerizable acrylate monomer (C1):
   10 to 80 parts by weight of the metal fluoride (C2);
   0.5 to 30 parts by weight of the photopolymerization initiator (C3); and
   1 to 20 parts by weight of the dispersion-enhancing chelating agent (C4).

3. The antireflective coating composition according to claim 1,
   wherein the photopolymerizable acrylate monomer (C1) is at least one selected from the group consisting of urethane acrylate oligomer, epoxy acrylate oligomer, dipentaerythritol hexa-acrylate, dipentaerythritol hydroxyl penta-acrylate, pentaerhthritol tetra-acrylate, pentaerythritol tri-acrylate, tri-methylene propyl tri-acrylate, propoxylated glycerol tri-acrylate, trimethylpropane ethoxy tri-acrylate, and compounds expressed in the following chemical formulas 1 to 5:

Chemical Formula 1

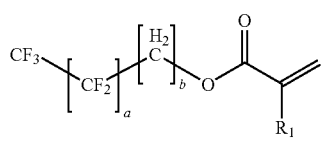

where $R_1$ is —H or —$CH_3$, a is an integer from 0 to 4, and b is an integer from 1 to 3, Chemical Formula 2

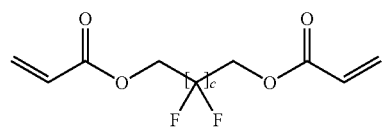

where c is an integer from 1 to 10,

Chemical Formula 3

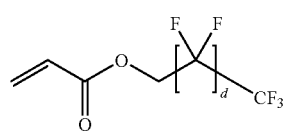

where d is an integer from 1 to 9,

Chemical Formula 4

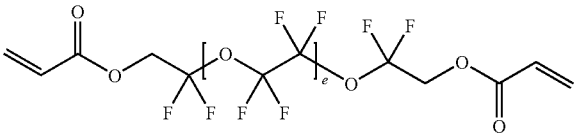

where e is an integer from 1 to 5,

Chemical Formula 5

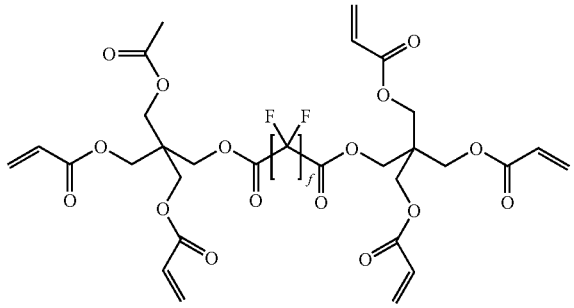

where f is an integer from 4 to 10.

4. The antireflective coating composition according to claim 1,
   wherein the metal fluoride (C2) is at least one selected from the group consisting of NaF, LiF, $AlF_3$, $Na_5Al_3F_{14}$, $Na_3AlF_6$, $MgF_2$ and $YF_3$.

5. The antireflective coating composition according to claim 1,
   wherein the metal fluoride (C2) has an average particle size of 10 to 100 nm.

6. The antireflective coating composition according to claim 1, further comprising:
   0.1 to 30 parts by weight of additive (C5), based on 100 parts by weight of the photopolymerizable acrylate monomer (C1), the additive being at least one selected from the group consisting of a wetting agent and a leveling agent; and
   organic solvent (C6) that makes the antireflective coating composition have a solid content of 0.1 to 30 weight %,
   wherein the organic solvent (C6) is at least one selected from the group consisting of aromatic hydrocarbons, aliphatic hydrocarbons, alcohols, ketones, amides, and ethers.

7. An antireflective coating film, which is manufactured using the antireflective coating composition defined in any one of the claims 1 to 6.

8. A method for manufacturing an antireflective coating film, comprising:
   (S1) coating the antireflective coating composition defined in any one of the claims 1 to 6 on a display substrate to have a dried thickness of 50 to 200 nm;
   (S2) drying the coated display substrate, prepared in the step (S1), at 20 to 150° C. for 0.5 to 10 minutes; and
   (S3) curing the dried coated display substrate, prepared in the step (S2), for 1 to 30 seconds with a UV (Ultraviolet) irradiation dose of 0.2 to 2 $J/cm^2$.

* * * * *